United States Patent
Abe et al.

(10) Patent No.: US 8,062,020 B2
(45) Date of Patent: Nov. 22, 2011

(54) THREE DIMENSIONAL STRUCTURE PRODUCING DEVICE AND PRODUCING METHOD

(75) Inventors: Satoshi Abe, Moriguchi (JP); Isao Fuwa, Osaka (JP); Norio Yoshida, Kitakatsuragi-gun (JP); Yoshikazu Higashi, Moriyama (JP); Hirohiko Togeyama, Tondabayashi (JP); Masataka Takenami, Osaka (JP); Takashi Shimizu, Kadoma (JP); Shushi Uenaga, Moriguchi (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 1686 days.

(21) Appl. No.: 10/546,454

(22) PCT Filed: Feb. 25, 2004

(86) PCT No.: PCT/JP2004/002181
§ 371 (c)(1),
(2), (4) Date: Jan. 17, 2006

(87) PCT Pub. No.: WO2004/076102
PCT Pub. Date: Sep. 10, 2004

(65) Prior Publication Data
US 2006/0192322 A1    Aug. 31, 2006

(30) Foreign Application Priority Data
Feb. 25, 2003 (JP) .................. 2003-048264

(51) Int. Cl.
*B28B 17/00* (2006.01)
*B29C 35/08* (2006.01)
*B29C 67/04* (2006.01)
*B28B 1/16* (2006.01)

(52) U.S. Cl. .............. 425/225; 425/375; 425/174.4; 264/308; 264/401; 264/497

(58) Field of Classification Search .......... 425/375, 425/174.4, 225; 264/308, 401, 113, 497
See application file for complete search history.

(56) References Cited

U.S. PATENT DOCUMENTS
4,818,562 A * 4/1989 Arcella et al. ............ 427/597
(Continued)

FOREIGN PATENT DOCUMENTS
DE    3445613    7/1985
(Continued)

OTHER PUBLICATIONS
English language Abstract of DE 3445613.
(Continued)

*Primary Examiner* — Maria Veronica Ewald
(74) *Attorney, Agent, or Firm* — Greenblum & Bernstein, P.L.C.

(57) ABSTRACT

An apparatus for making a three-dimensional object includes a powdery layer-forming unit for forming a powdery layer on a table and an optical beam-irradiating unit for irradiating an optical beam on a predetermined region of the powdery layer to sinter the predetermined region. The optical beam-irradiating unit is disposed at a position spaced from immediately above an optical beam-irradiating range to obliquely irradiate the optical beam on the powdery layer. Because fumes generated by irradiating and heating the powdery layer with the optical beam rise towards a position immediately above them, the optical beam is irradiated from the position spaced from immediately above the optical beam-irradiating range, thereby reducing a cloud of the optical beam-irradiating unit that may be caused by the fumes.

5 Claims, 12 Drawing Sheets

U.S. PATENT DOCUMENTS

| | | | |
|---|---|---|---|
| 5,143,663 A * | 9/1992 | Leyden et al. | 264/401 |
| 5,393,482 A | 2/1995 | Benda et al. | |
| 5,658,412 A * | 8/1997 | Retallick et al. | 156/272.8 |
| 5,960,853 A * | 10/1999 | Sterett et al. | 164/271 |
| 6,215,093 B1 * | 4/2001 | Meiners et al. | 219/121.61 |
| 6,554,600 B1 | 4/2003 | Hofmann et al. | |
| 6,583,379 B1 | 6/2003 | Meiners et al. | |
| 6,657,155 B2 | 12/2003 | Abe et al. | |
| 6,932,935 B1 * | 8/2005 | Oberhofer et al. | 264/497 |
| 2002/0041818 A1 | 4/2002 | Abe et al. | |
| 2003/0003179 A1 * | 1/2003 | Farnworth et al. | 425/174.4 |
| 2005/0029711 A1 | 2/2005 | Abe et al. | |

FOREIGN PATENT DOCUMENTS

| | | |
|---|---|---|
| DE | 19853947 | 2/2000 |
| JP | 1-502890 | 10/1989 |
| JP | 4214864 | 8/1992 |
| JP | 2000-73108 | 3/2000 |
| JP | 2002-115004 | 4/2002 |
| JP | 2002-210835 | 7/2002 |
| JP | 2002-527613 | 8/2002 |
| WO | 88/02677 | 4/1988 |
| WO | WO 01/10631 A2 * | 2/2001 |

OTHER PUBLICATIONS

English language Abstract of DE 19853947.
English language abstract of JP 1-502890.
English language abstract of JP 88-02677.
English language abstract of JP 2002-527613.
English language abstract of JP 2002-210835.
English language abstract of JP 2000-73108.
English language Abstract of JP4-214864.
English Language abstract of JP 2002-115004.

* cited by examiner

THREE DIMENSIONAL STRUCTURE PRODUCING DEVICE AND PRODUCING METHOD

TECHNICAL FIELD

The present invention relates to a method of and apparatus for making a three-dimensional object by irradiating an optical beam on a powdery layer of inorganic or organic powdery material to form a sintered layer and by laminating sintered layers one above another.

BACKGROUND ART

A method of making a three-dimensional object by laminating sintered layers is known in, for example, Japanese Laid-Open Patent Publication No. 1-502890, wherein an optical beam (directional energy beam, for example, a laser) is first irradiated on a powdery layer formed on a table to form a sintered layer. The sintered layer thus obtained is then covered with a new powdery layer, on which the optical beam is irradiated to form a new sintered layer. These processes are repeatedly carried out to form a three-dimensional object in which a plurality of sintered layers are laminated one above another.

This prior art includes a powder supply unit for supplying a powdery material onto the table, which is accommodated in a chamber held in a predetermined atmosphere, to form a powdery layer, and also includes an optical beam-irradiating unit disposed outside the chamber for irradiating an optical beam on the powdery layer through a light transmitting window (including a window made up of a lens) disposed immediately above the table.

When the powdery material is irradiated with a high energy optical beam for sintering (in some cases, the powdery material is solidified after once melted), fumes (for example, metallic vapor when metallic powder is employed as the powdery material) are generated. The fumes rise and adhere or stick to the window disposed immediately above them, thereby clouding up the window and lowering the permeability to the optical beam. Accordingly, it becomes impossible to stabilize the sintering or increase the density of sintered portions, resulting in a reduction in strength of a three-dimensional object. The permeability to the optical beam is also reduced by the scattering and floating powder or the powder that has been caused to adhere to the window.

In addition, the three-dimensional object obtained upon completion of the sintering is taken out from the chamber, but Japanese Laid-Open Patent Publication No. 1-502890 discloses no removing mechanism, and the three-dimensional object is manually taken out under the existing circumstances.

However, the object to be made has a size of, for example, 500 mm×500 mm×100 mm, and if it is made from a metallic powdery material having a specific gravity of, for example, 6-8, the object obtained comes to have a weight of 150-200 kg. Because manual removal of the object of such a weight is most unlikely, a crane is employed. In an apparatus having an optical beam-irradiating unit above a table, however, the optical beam-irradiating unit must be moved at the time of removal of the object by the crane. In this case, the repeatability for positioning of an optical axis is lost and, hence, the machining accuracy lowers considerably or adjusting work is needed whenever the shaping is conducted.

In an apparatus as disclosed in Japanese Laid-Open Patent Publication No. 2002-527613, because the side of the table is movable, interference between the optical beam-irradiating unit and the crane can be avoided. In this case, however, there is a good chance that the powder may be gotten caught in the movable table and incline it and, hence, it becomes difficult to ensure the repeatability for positioning of the optical axis, and a very complicated mechanism is needed.

The present invention has been developed to overcome the above-described disadvantages.

It is accordingly a primary objective of the present invention to provide a method of and apparatus for making a three-dimensional object that is not affected by fumes or scattering powder.

Another objective of the present invention is to provide a method of and apparatus for making a three-dimensional object that can facilitate removal of a shaped object from a chamber.

DISCLOSURE OF THE INVENTION

In accomplishing the above objective, the apparatus for making a three-dimensional object according to the present invention includes a table, a powdery layer-forming unit for forming a powdery layer on the table, and an optical beam-irradiating unit for irradiating an optical beam on a predetermined region of the powdery layer to sinter the predetermined region, wherein the optical beam-irradiating unit is disposed at a position deviated from immediately above an optical beam-irradiating range to obliquely irradiate the optical beam on the powdery layer.

Although fumes generated by irradiating and heating the powdery layer with the optical beam rise towards a position immediately above them, a cloud of the optical beam-irradiating unit (a window mounted on a chamber to allow the optical beam to pass therethrough) that may be caused by the fumes can be reduced by irradiating the optical beam from the position deviated from immediately above the optical beam-irradiating range.

It is preferred that the optical beam-irradiating unit includes a beam shape-correcting unit for correcting a shape of the optical beam to form a generally round spot beam on a surface to be irradiated. In spite of irradiation in an oblique direction, the generally round spot beam is irradiated on the powdery layer, making it possible to conduct stable sintering.

If a fume blocking means permeable to light for blocking fumes generated during sintering from passing therethrough is interposed between the optical beam-irradiating range and a portion of the optical beam-irradiating unit from which the optical beam is emitted, a reduction in permeability to light can be positively prevented.

Also, if a fume capturing unit for capturing fumes is disposed immediately above the optical beam-irradiating range, a reduction in permeability to light that may be caused by the fumes can be further positively prevented.

The apparatus further includes a chamber for accommodating the table and the powdery layer-forming unit therein and a lid for opening and closing an opening defined in the chamber at a location immediately above the optical beam-irradiating range. By this construction, upon completion of the sintering and upon removal of unsolidified powder on the table, the three-dimensional object can be taken out from the chamber through the opening using, for example, a crane without causing any interference with the optical beam-irradiating unit, making it possible to prevent powder from scattering outside the chamber.

Further, upon completion of the sintering, the amount of fumes that remain in the chamber and the oxygen content within the chamber are measured while cleaning an atmosphere inside the chamber and replacing an atmospheric gas with air. When the amount of fumes and the oxygen content become less than respective predetermined values, the three-dimensional object is taken out through the opening, thereby preventing external environmental pollution.

DETAILED DESCRIPTION OF THE PREFERRED EMBODIMENTS

Embodiments of the present invention are explained hereinafter with reference to the drawings.

Figure 1:
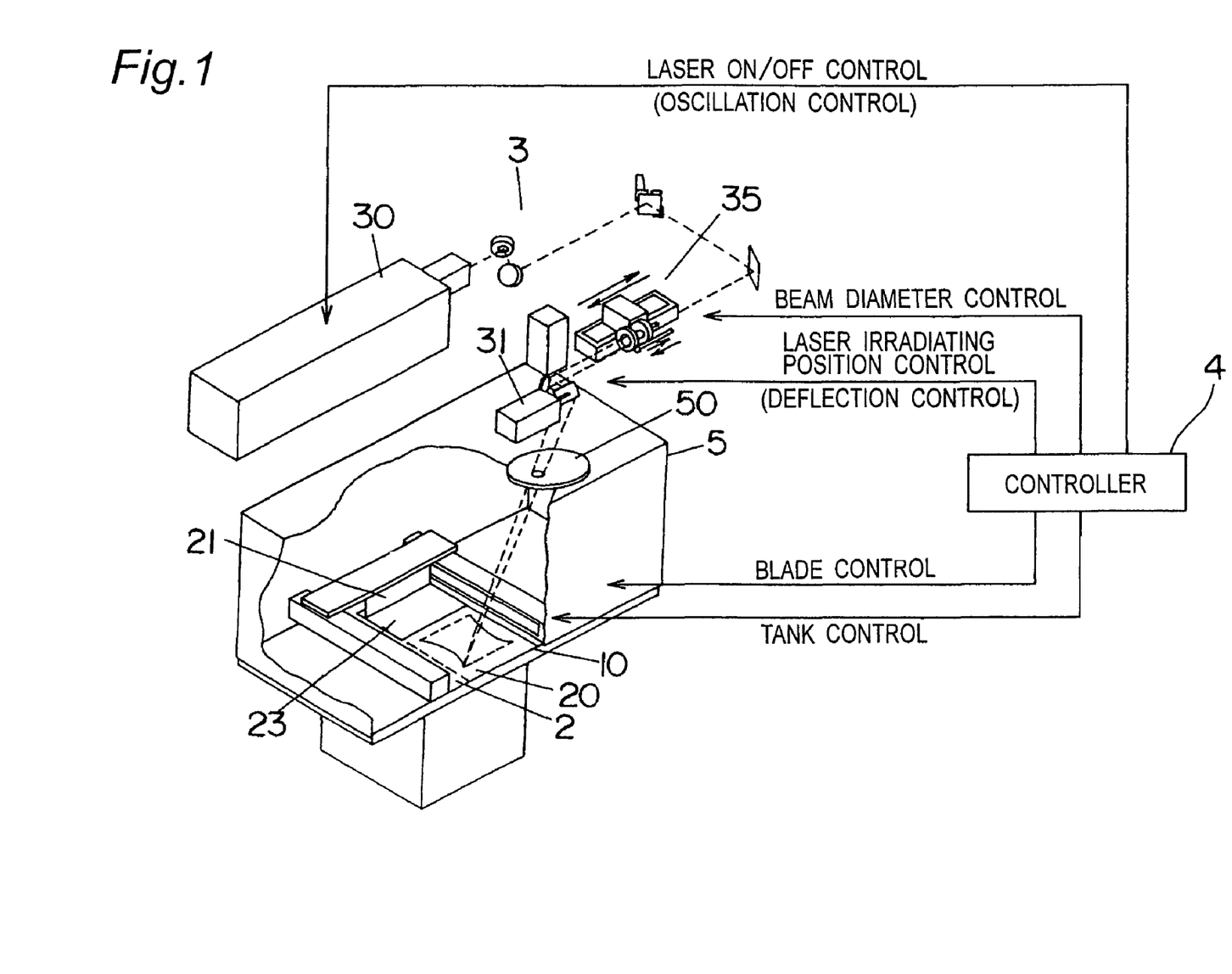
FIG. 1 is a perspective view, partly in section, of an apparatus for making a three-dimensional object according to the present invention.

FIG. 1 depicts an apparatus for making a three-dimensional object according to the present invention, which includes a powdery layer-forming unit 2, an optical beam-irradiating unit 3, and a chamber 5 for accommodating the powdery layer-forming unit 2 therein.

The powdery layer-forming unit 2 forms a powdery layer 10 of a predetermined thickness $\Delta t1$ on a table 20 that is vertically movable within an enclosed space by a cylinder, by supplying and leveling a metallic powdery material on the table 20 with the use of a leveling blade 21.

The optical beam-irradiating unit 3 irradiates a laser outputted from a laser generator 30 on the powdery layer 10 via a scanning optical system including a galvanomirror 31 and the like. The optical beam-irradiating unit 3 is disposed outside the chamber 5, and the optical beam emitted therefrom is irradiated on the powdery layer 10 through a light transmitting window 50 mounted on the chamber 5. A beam shape-correcting unit 35 is disposed on the upstream side of the scanning optical system in the direction of travel of the optical beam to irradiate a generally round spot beam on a surface to be irradiated, i.e., the powdery layer 10.

A material permeable to the optical beam is used for the window 50. In the case where the laser generator 30 is a $CO_2$ laser, a flat plate made of ZnSe or the like can be used. The window 50 may be made up of a lens (for example, an F$\theta$ lens).

Figure 2:
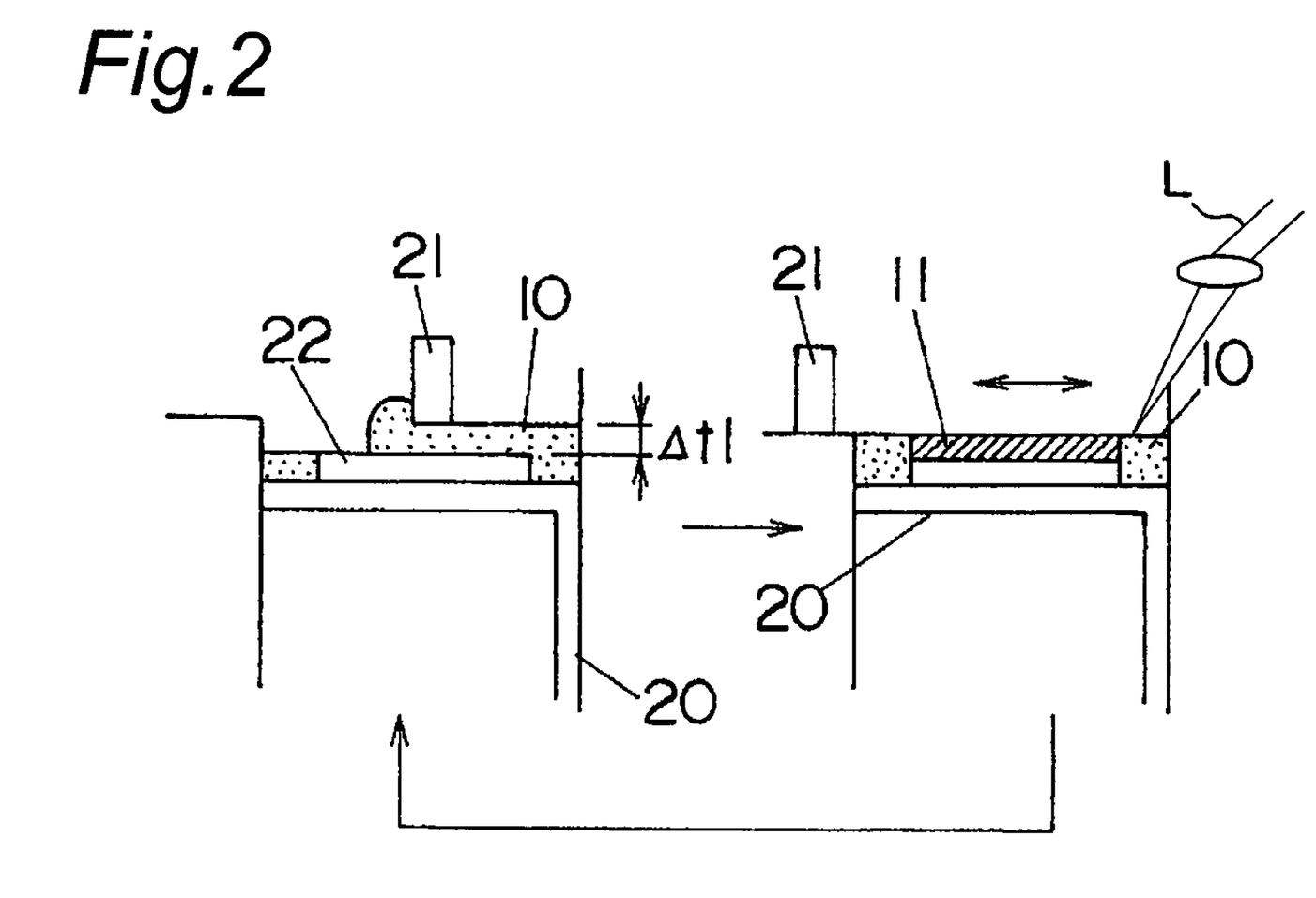
FIG. 2 is a schematic view depicting the operation of the apparatus of FIG. 1.

FIG. 2 depicts how to make a three-dimensional object using the apparatus referred to above. As shown therein, a powdery material that has overflowed a powder tank 23 is supplied on a shaping base 22 mounted on the table 20 by the leveling blade 21. The powdery material so supplied on the base 22 is simultaneously leveled by the leveling blade 21 to form a first powdery layer 10, and an optical beam (laser beam) L is then irradiated on a desired portion of the first powdery layer 10 to sinter it, thereby forming a sintered layer 11 united with the base 22. Thereafter, the table 20 is lowered by a predetermined length, and a second powdery layer 10 is formed on both the first powdery layer 10 and the sintered layer 11 by supplying the powdery material again and by leveling it using the leveling blade 21. The optical beam L is again irradiated on a desired portion of the second powdery layer 10 to sinter it, thereby forming another sintered layer 11 united with the underlying sintered layer 11. Iron powder having an average particle diameter of, for example, 30 µm is used for the powdery material, but any other appropriate materials can also be used.

Figure 3:
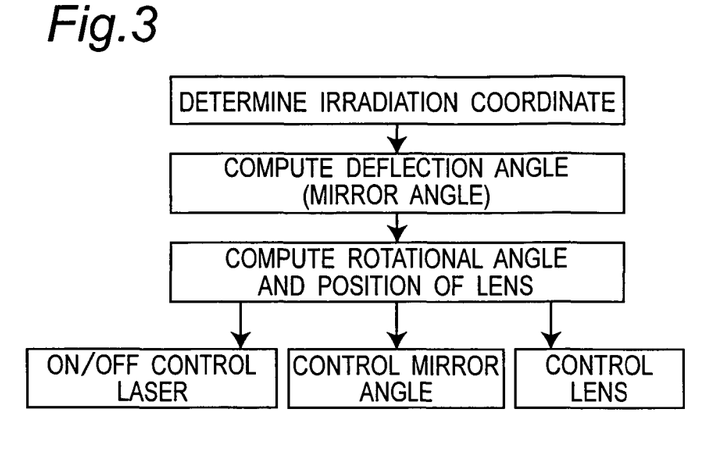
FIG. 3 is a flowchart depicting a method of controlling the apparatus of FIG. 1.

A method of controlling the apparatus for making a three-dimensional object according to the present invention is briefly explained hereinafter with reference to FIGS. 1 and 3.

The powdery layer-forming unit 2 and the optical beam-irradiating unit 3 are both electrically connected to a controller 4. The controller 4 controls the powdery layer-forming unit 2 so as to supply a metallic powdery material accommodated in the powder tank 23 onto the table 20 and level the metallic powdery material using the blade 21. The controller 4 also controls the optical beam-irradiating unit 3 such that when the powdery layer 10 is irradiated with the laser, the laser generator 30 is ON/OFF controlled (oscillation control), the beam shape-correcting unit 35 is controlled to provide a desired beam diameter for the purpose of irradiating a generally round spot beam on the powdery layer 10, and the scanning optical system is controlled (deflection control) so as to irradiate the laser on a predetermined position of the powdery layer 10.

More specifically, the controller 4 first determines an irradiation coordinate depending on an optical beam-irradiating path that has been inputted in advance. The controller 4 then computes a deflection angle (mirror angle) of the galvanomirror 31 and a rotational angle and a position of, for example, a cylindrical lens constituting the beam shape-correcting unit 35. Based on the results of computation, the controller 4 ON/OFF controls the laser generator 30, deflection controls the galvanomirror 31, and controls the angle and position of the cylindrical lens.

Figure 4:
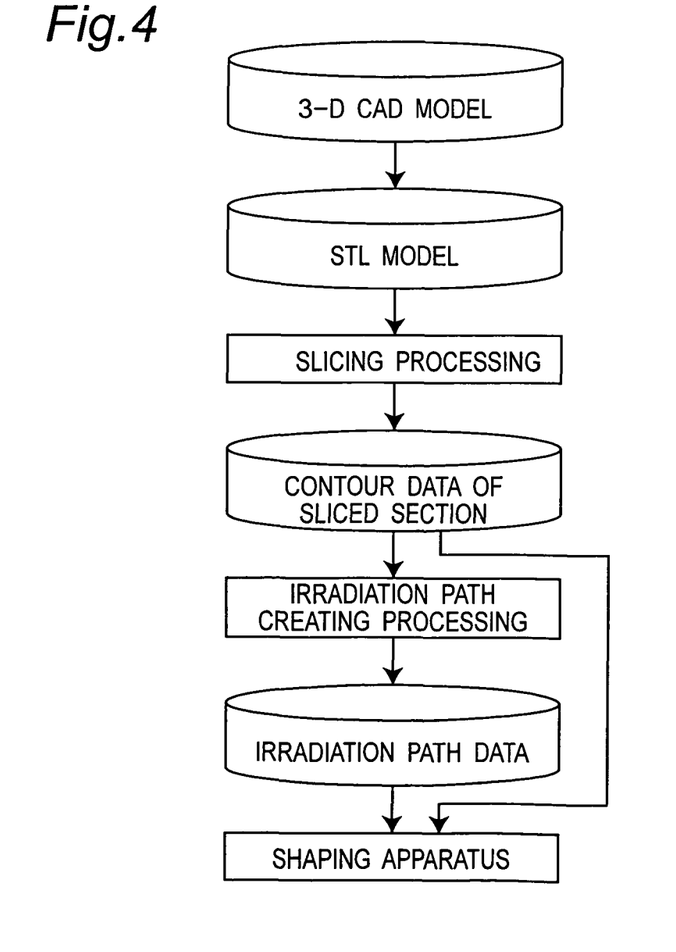
FIG. 4 is a block diagram for preparing an optical beam irradiating path.

As shown in FIG. 4, data indicative of the optical beam-irradiating path can be prepared from three-dimensional CAD data in advance. For example, contour data of each section are prepared by slicing STL data, created from a three-dimensional CAD model, at equal pitches (0.05 mm in the case where Δt1 is 0.05 mm), and an irradiating path-creating processing is conducted on such data to create the data indicative of the optical beam-irradiating path, which are then inputted together with the contour data into the apparatus.

In this apparatus, a process of forming a new powdery layer 10 after the table 20 has been lowered and a process of irradiating the optical beam L on a desired portion of the new powdery layer 10 to form a new sintered layer 11 are repeatedly carried out, thereby making a target three-dimensional object as a laminated body of the sintered layers. A $CO_2$ laser is preferably used as the optical beam. In applications where the three-dimensional object is a forming die, the preferred thickness Δt1 of each powdery layer 10 is about 0.05 mm.

Figure 5:
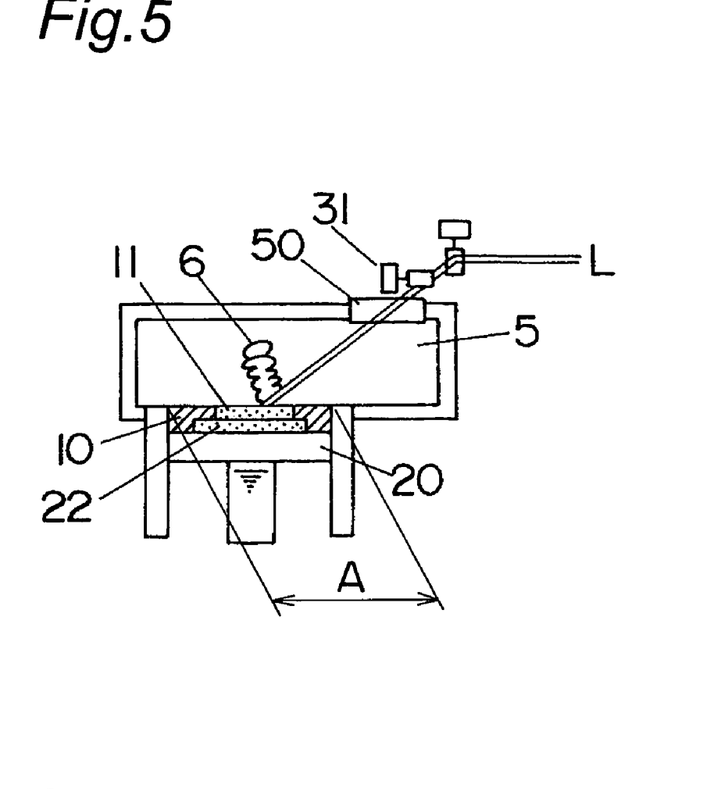
FIG. 5 is a vertical sectional view of the apparatus of FIG. 1, depicting a fume generating mechanism.

When sintering is conducted by irradiating the optical beam L on the powdery material, fumes 6 are generated as explained above. As shown in FIG. 5, such fumes 6 rise and reach a position immediately above an optical beam-irradiating range A, and for this reason, the window 50 is located at a position of the chamber 5 that is laterally deviated from immediately above the optical beam-irradiating range A so that irradiation of the optical beam on the powdery layer 10 may be obliquely conducted. That is, deviation of the window 50 from the position immediately above the irradiating range A reduces the possibility of the fumes 6 adhering or sticking to an internal surface of the window 50. Although it is preferred that the window 50 and the irradiating range A do not overlap with each other, even if they overlap partly, there arises no problem if the optical beam L does not pass through an area of the window 50 where they overlap with each other.

Irradiation of the optical beam on the powdery layer 10 from obliquely above causes an optical spot beam on the powdery layer 10 to be oval-shaped and not round-shaped. In addition, the shape of the optical spot beam varies depending on the distance from the window 50. Accordingly, in the illustrated embodiment, the beam shape-correcting unit 35 is disposed on the upstream side of the scanning optical system, which is constituted by the galvanomirror 31 and the like, in the direction of travel of the optical beam so that a generally round spot beam may be irradiated on a surface to be irradiated, i.e., the powdery layer 10.

Figure 6:
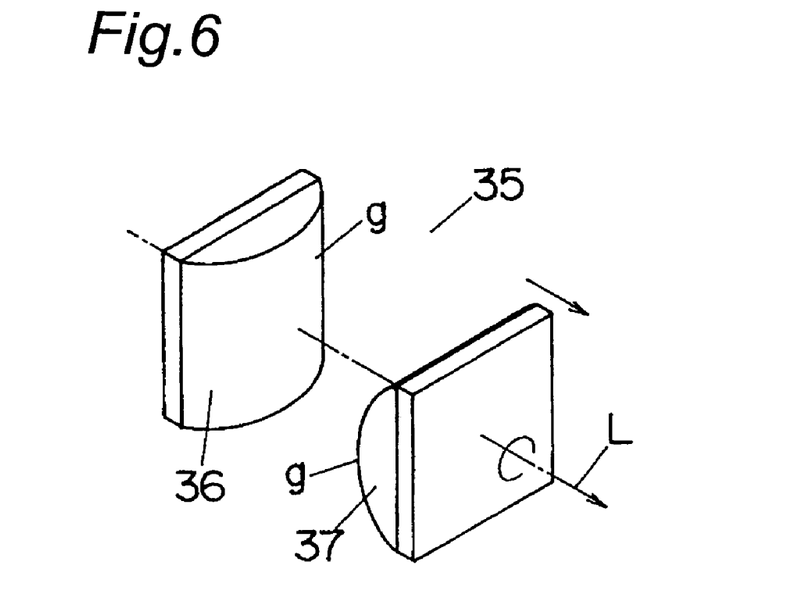
FIG. 6 is a perspective view of a beam shape-correcting unit mounted on the apparatus of FIG. 1.

FIG. 6 depicts an example of the beam shape-correcting unit 35, which includes a pair of cylindrical lenses 36, 37 and a rotating mechanism (not shown) for rotating the cylindrical lenses 36, 37 about the axis of the optical beam. In applications where the pair of cylindrical lenses 36, 37 are juxtaposed with each other in the axial direction of the optical beam, they are designed such that not only can one or both of them be rotated, but they can also be independently moved in the axial direction of the optical beam to change the interval therebetween.

Figure 7A:
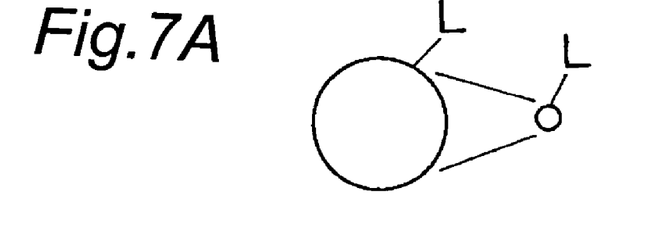
FIGS. 7A to 7D are views depicting beam shape corrections by the beam shape-correcting unit.
Figure 7B:
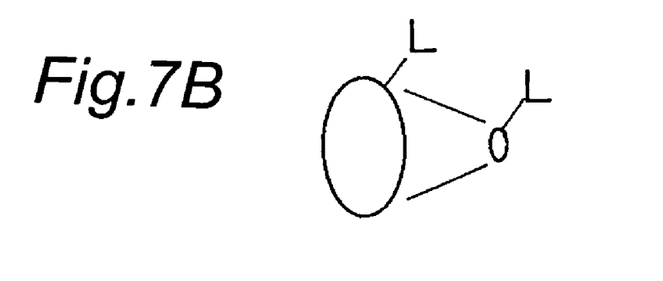
Figure 7C:
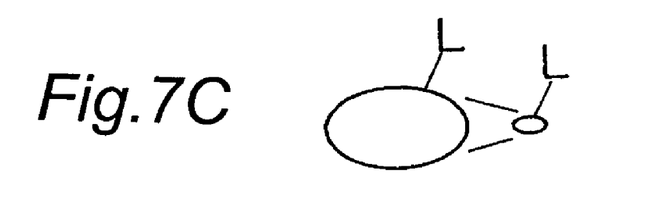
Figure 7D:
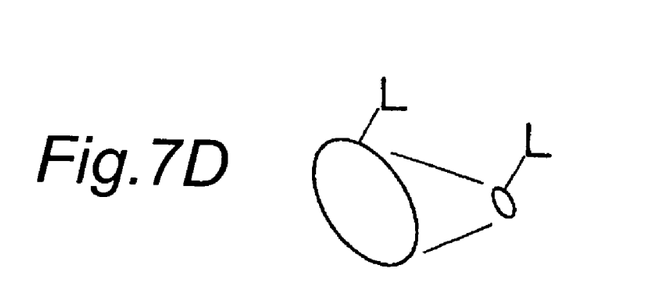

As shown in FIG. 6, if ridge lines of convex surfaces (g) of the cylindrical lenses 36, 37 lie at right angles, an optical beam L having a round section such as shown in FIG. 7A is obtained when the optical beam L has passed through the lens system, i.e., the cylindrical lenses 36, 37. In this case, the beam diameter can be changed by controlling the interval between the two cylindrical lenses 36, 37. If the ridge lines of the convex surfaces (g) of the cylindrical lenses 36, 37 lie parallel to each other in the vertical direction, an optical beam L having an oval section such as shown in FIG. 7B is obtained with a major axis thereof oriented in the vertical direction. If the ridge lines of the convex surfaces (g) of the cylindrical lenses 36, 37 lie parallel to each other in the horizontal direction or in an oblique direction, an optical beam L having an oval section such as shown in FIG. 7C or 7D is obtained with a major axis thereof oriented in the respective direction. Further, if the ridge lines of the convex surfaces (g) of the cylindrical lenses 36, 37 intersect at a specific angle between the parallel state and the orthogonal state, the proportion of the major axis and the minor axis can be optionally changed.

In the practice of the present invention, the beam shape-correcting unit 35 is designed to emit an optical beam L having an oval section so that a generally round spot beam may reach the surface of the powdery layer 10. By so doing, a generally round spot beam can be applied to the surface to be irradiated irrespective of irradiation of the optical beam L in an oblique direction. In particular, a round spot beam can be always applied to the surface to be irradiated by correcting the sectional shape of the optical beam L according to the angle of irradiation that varies depending on the position where the optical beam L is irradiated.

It is to be noted here that although in the above-described embodiment two cylindrical lenses 36, 37 are used for the beam shape-correcting unit 35, a round spot beam may be altered to an oval spot beam having a major axis oriented in a specific direction using only one cylindrical lens. In this case, a round or generally round spot beam is irradiated on the powdery layer 10 in the optical beam-irradiating range A by obliquely irradiating the oval spot beam.

Figure 8A:
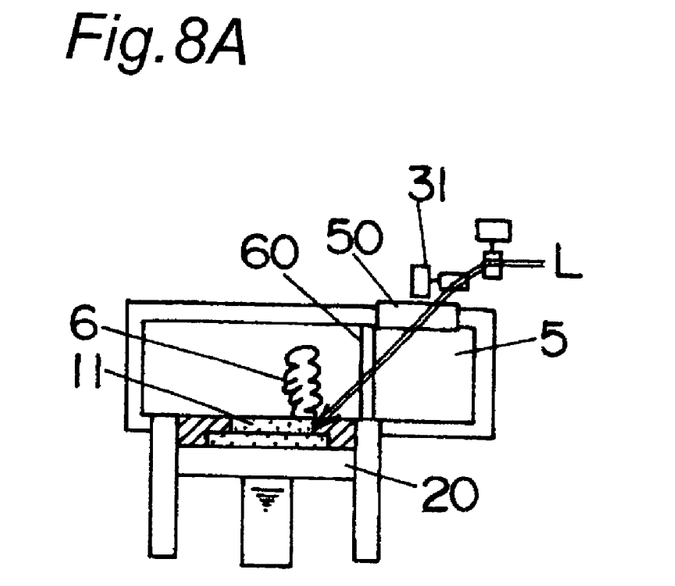
FIG. 8A is a schematic vertical sectional view of a modification of the apparatus according to the present invention.
Figure 8B:
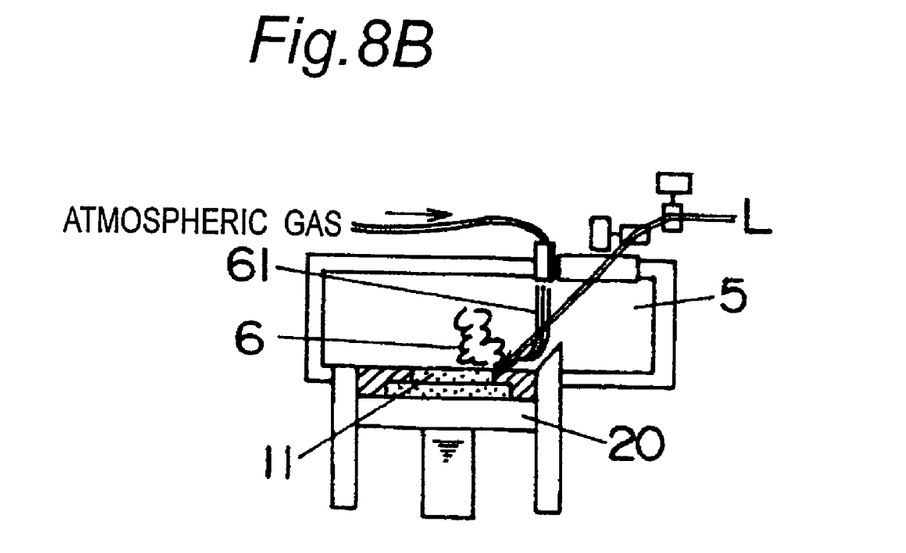
FIG. 8B is a schematic vertical sectional view of another modification of the apparatus according to the present invention.

FIG. 8A or 8B depicts another embodiment, in which a fume blocking means is provided in view of the fact that fumes 6 cannot be completely prevented from adhering to the window 50 that allows the optical beam L to pass therethrough, merely by shifting the window 50 from the position immediately above the optical beam-irradiating range. The chamber 5 is divided into two compartments by the fume blocking means that is permeable to light and acts to block the fumes 6 from passing therethrough. The table 20 is disposed on one side of the chamber 5, while the window 50, from which the optical beam L is finally emitted, is disposed on the other side of the chamber 5.

The fume blocking means may be a vertically extending transparent plate 60 as shown in FIG. 8A, but a gas curtain 61 as shown in FIG. 8B can be preferably used. In particular, in order to produce a non-oxidizing atmosphere within the chamber 5, if the gas curtain 61 is formed with an atmospheric gas such as nitrogen gas that is to be supplied into the chamber 5, it becomes possible to easily prevent the fumes from reaching the window 50, while maintaining the atmosphere.

Figure 9:
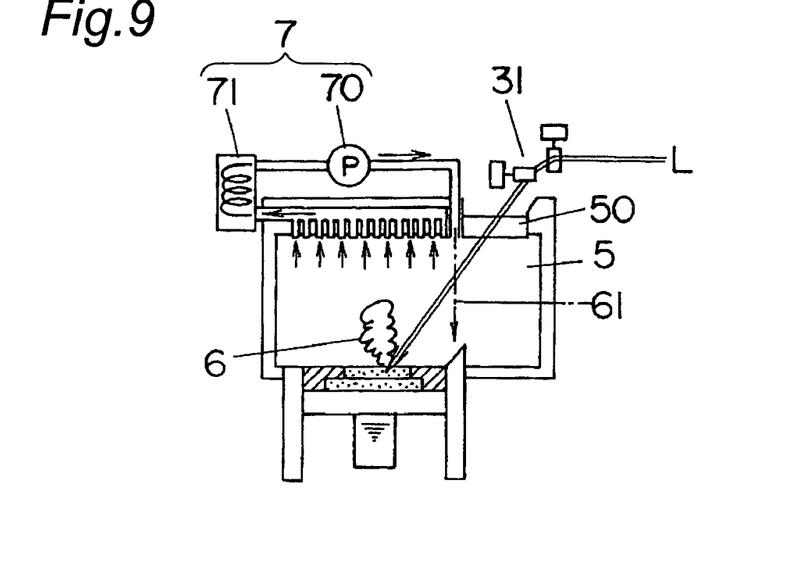
FIG. 9 is a schematic vertical sectional view of a further modification of the apparatus according to the present invention.

FIG. 9 depicts a further embodiment, in which a fume capturing unit 7 is disposed immediately above the irradiating range of the optical beam L. The illustrated fume capturing unit 7 includes an air pump 70 and a filter 71, and captures fumes 6 and powder scattering in the chamber 5 by sucking the atmospheric gas within the chamber 5 through suction ports defined in a ceiling portion of the chamber 5 and by causing the atmospheric gas to pass through the filter 71. Although the sucked atmospheric gas is returned into the chamber 5, the gas curtain 61 acts to positively and reliably prevent the fumes 6 from lowering the permeability to light.

Any material can be used for the filter 71 if it can effectively capture the fumes 6 and powder. A filter of the labyrinth type or cyclone type may be used. In the case where powder is a magnetic material, a magnet may be used.

Figure 10:
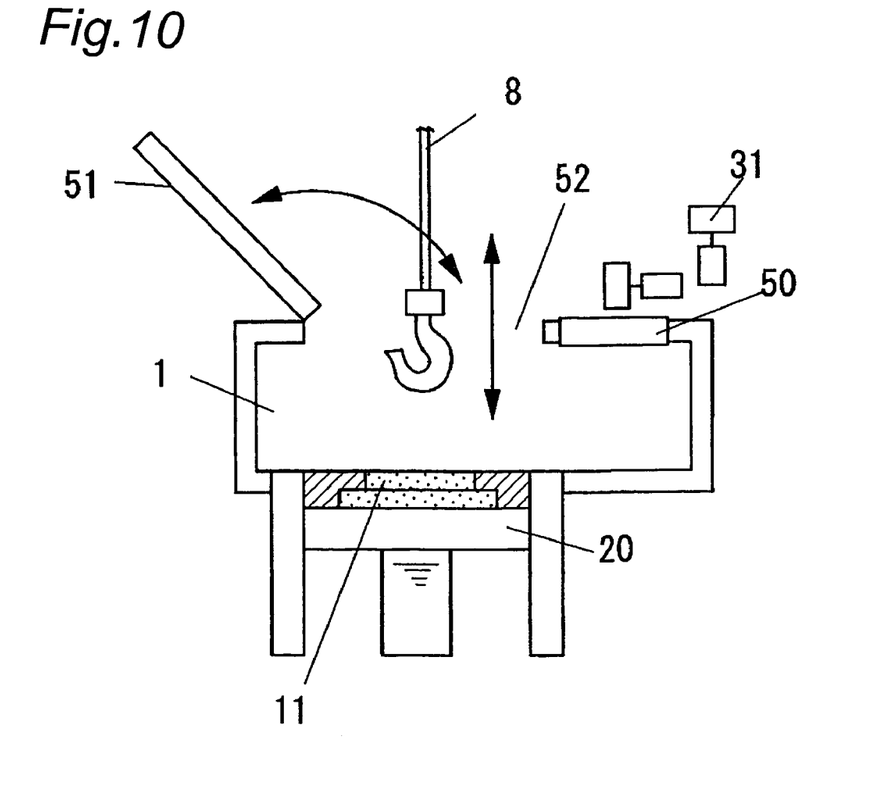
FIG. 10 is a schematic vertical sectional view of the apparatus according to the present invention, particularly depicting a structure for opening and closing a ceiling portion of a chamber.

FIG. 10 depicts another embodiment, in which the chamber 5 has an opening 52 defined in a ceiling portion thereof immediately above the optical beam-irradiating range and a lid 51 for opening and closing the opening 52. The opening 52 is intended to allow a crane 8 to take out a shaped object therethrough. Because the chamber 5 is filled with inert gas during sintering, the chamber 5 is made airtight using a packing or the like when the lid 51 is closed.

Figure 11A:
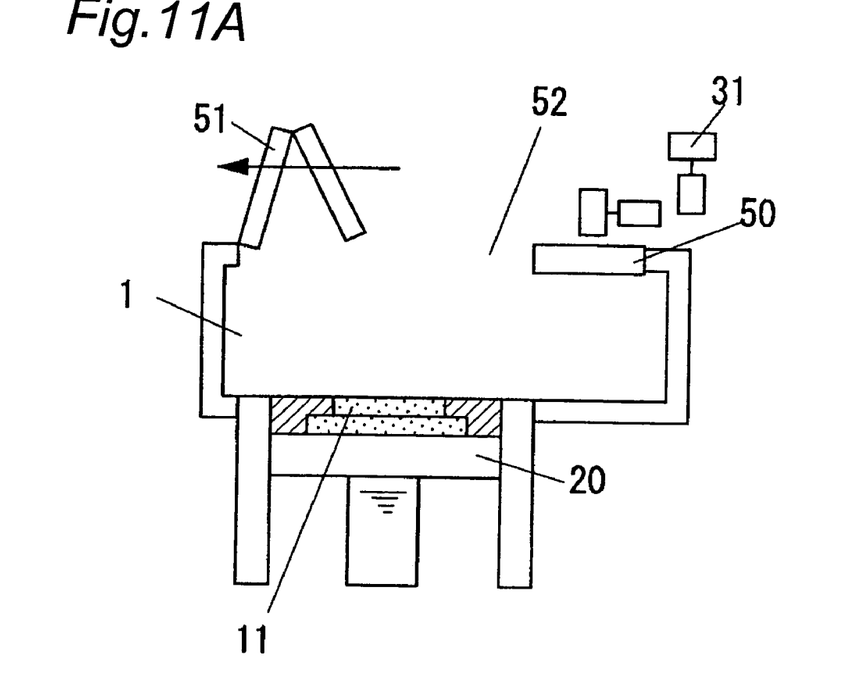
FIG. 11A is a schematic vertical sectional view depicting another opening and closing structure for the ceiling portion of the chamber.
Figure 11B:
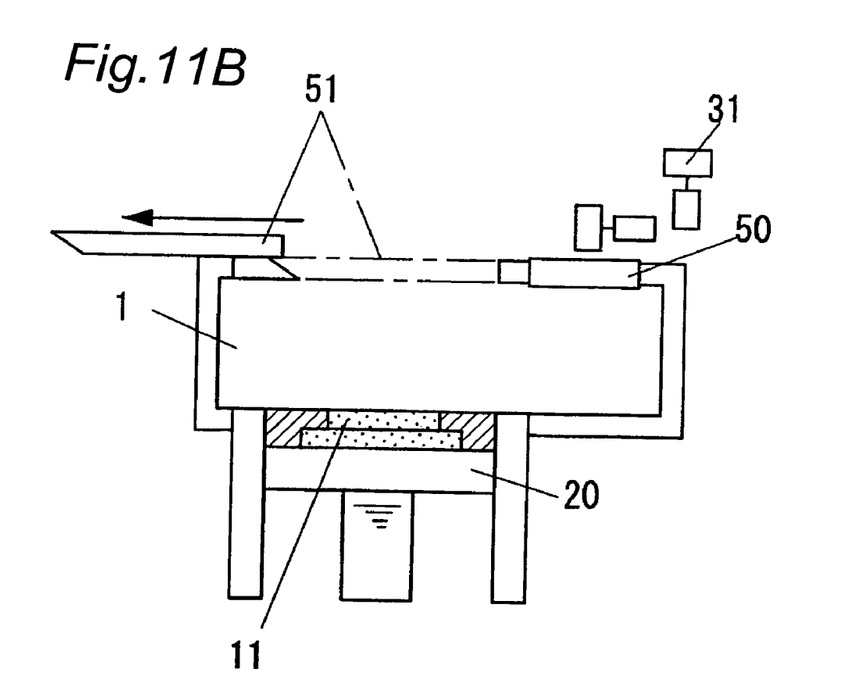
FIG. 11B is a schematic vertical sectional view depicting a further opening and closing structure for the ceiling portion of the chamber.

A structure for opening and closing the lid 51 such as shown in FIG. 10 is of a rotating type having a hinge, but a folding-type lid 51 as shown in FIG. 11A or a sliding-type lid 51 as shown in FIG. 11B may also be used, and the structure for opening and closing the lid 51 is not limited to those shown in the figures.

Figure 12:
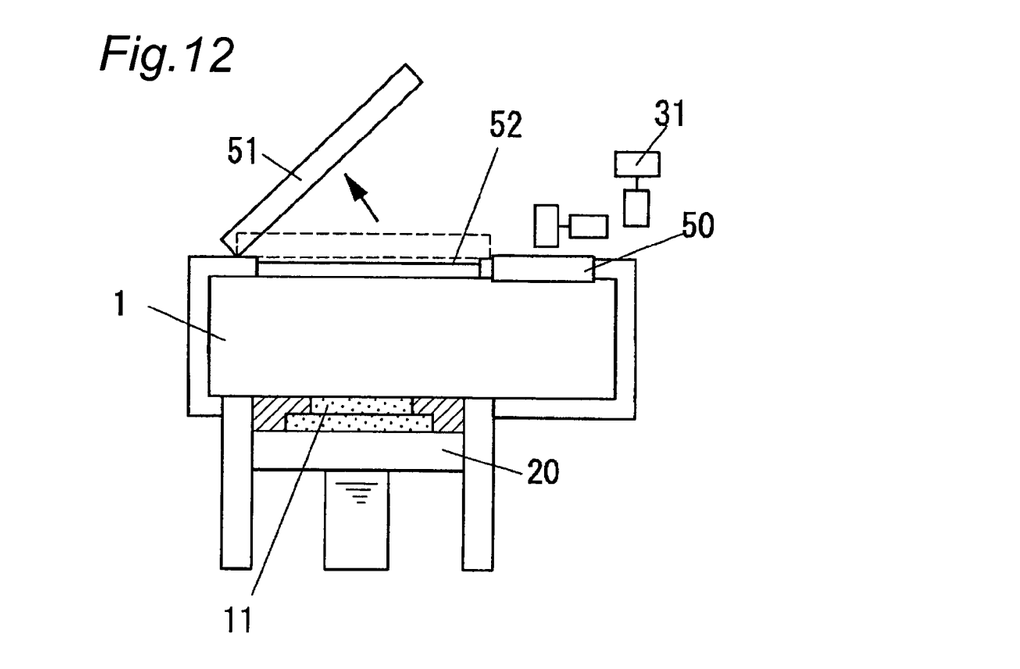
FIG. 12 is a schematic vertical sectional view depicting a case where a fume capturing unit has been shifted from an opening in the apparatus according to the present invention.

As shown in FIG. 12, if the fume capturing unit 7 is used together with the opening and closing structure, the fume capturing unit 7 must be so designed that it can be moved away from the position immediately above the optical beam-irradiating range, for example, by sliding movement. Alternatively, the fume capturing unit 7 may be mounted on the lid 51. In any case, such unit must be so designed as not to impede removal of the shaped object through the opening 52.

Figure 13:
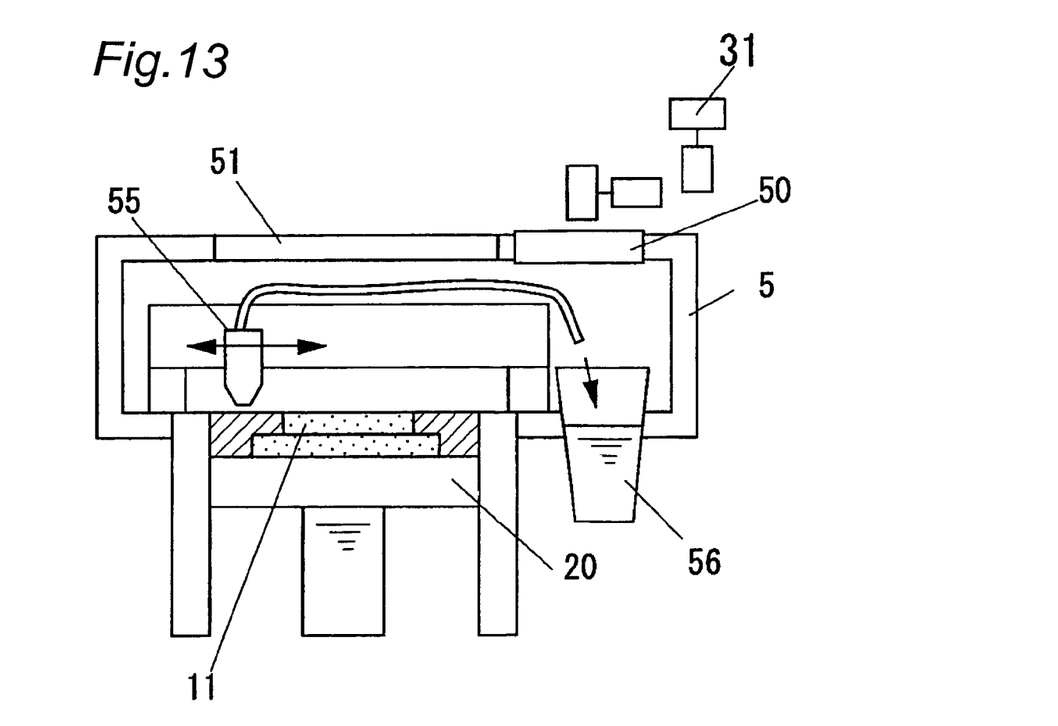
FIG. 13 is a schematic vertical sectional view of a modification of the apparatus according to the present invention.
Figure 14A:
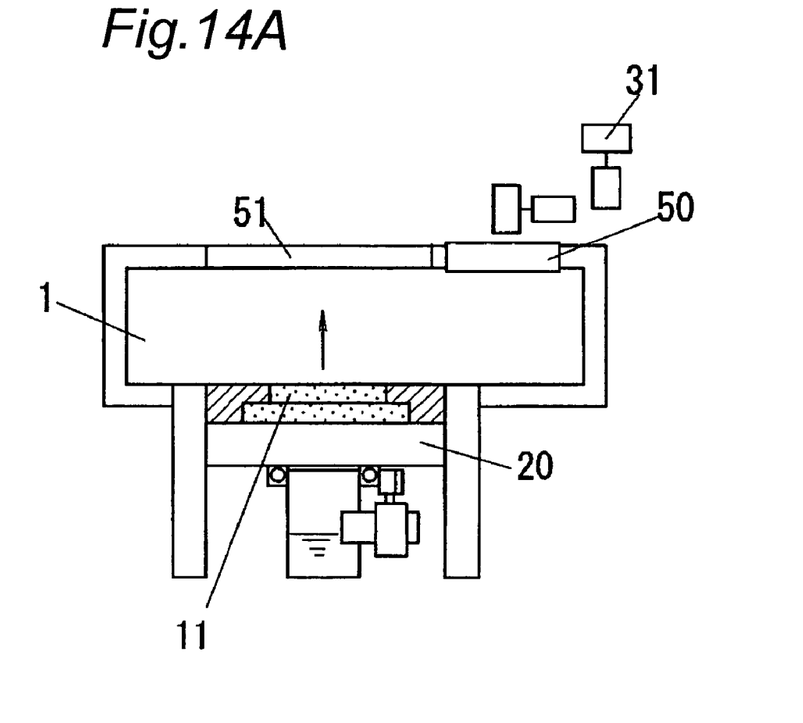
FIGS. 14A and 14B are schematic vertical sectional views of another modification of the apparatus according to the present invention.
Figure 14B:
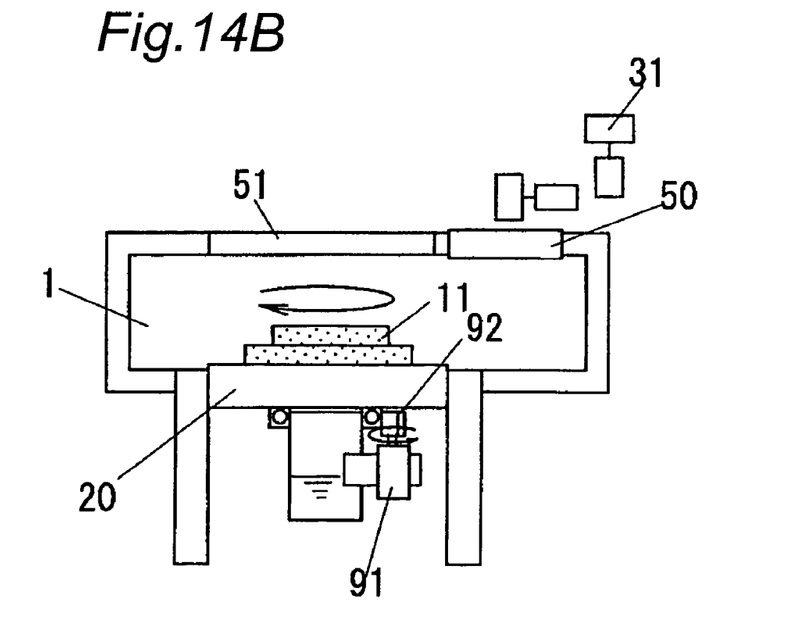

When the sintering has been completed, a powdery material that has not been solidified remains on the table 20 in addition to the shaped object. It is preferred that such a powdery material be removed in the manner as shown in FIG. 13, in which it is sucked by a nozzle 55 and stored in a container 56. Alternatively, as shown in FIGS. 14A and 14B, the table 20 is first moved upwards and subsequently rotated so that the powdery material may be blown away from the table 20. Upon removal of the powdery material from the table 20, the lid 51 is opened. In FIG. 14B, reference numeral 91 denotes a drive motor, and reference numeral 92 denotes gears.

Figure 15:
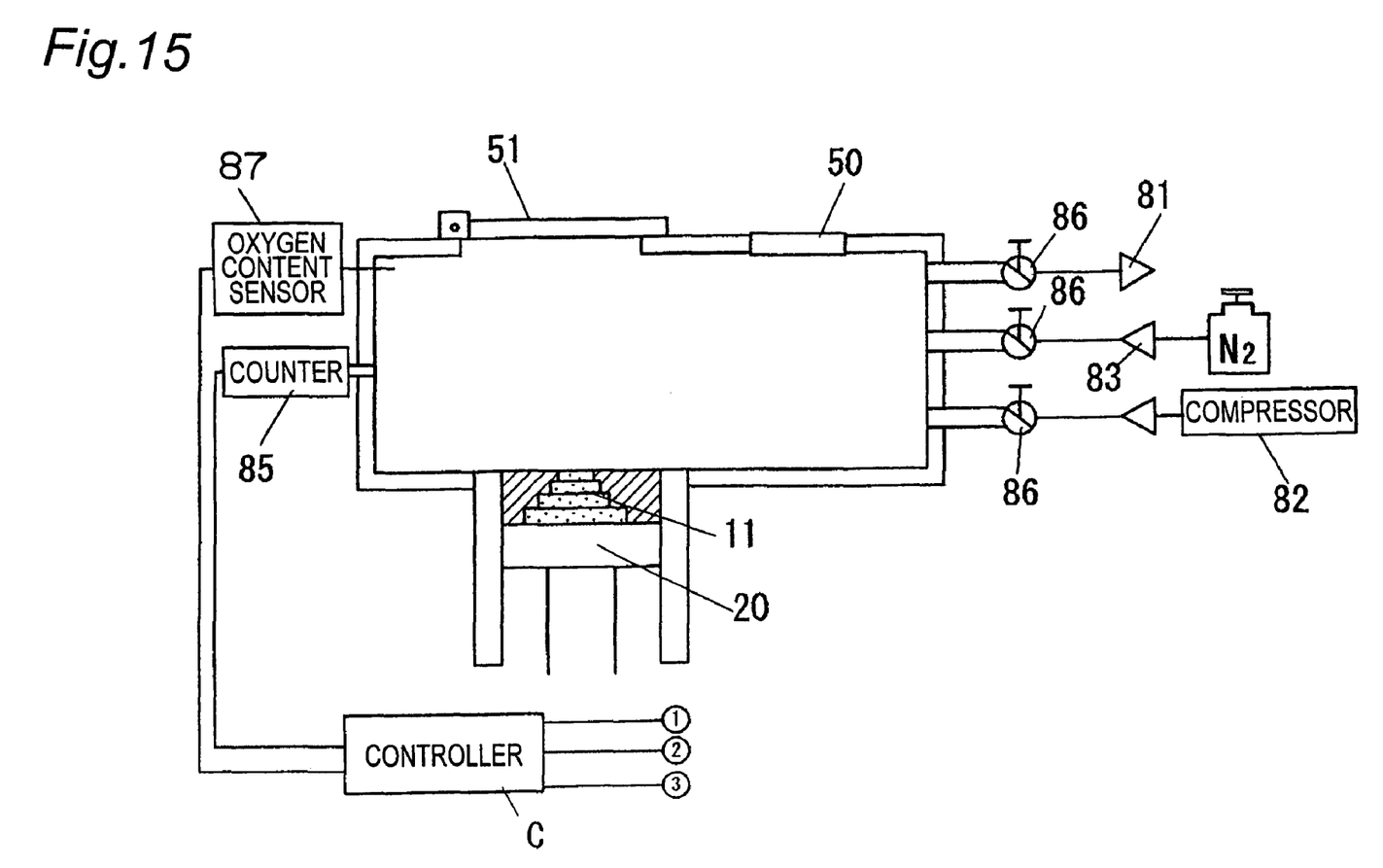
FIG. 15 is a schematic vertical sectional view of a further modification of the apparatus according to the present invention.

As explained hereinabove, because inert gas is filled in the chamber 5 or fumes remain in the chamber 5, it is also preferable that the apparatus has a construction as shown in FIG. 15. This apparatus includes a vacuum pump 81 for sucking an atmospheric gas contained in the chamber 5, and a compressor 82 for supplying air into the chamber 5 for cleaning of the atmosphere inside the chamber 5 and for replacement of the atmospheric gas with air. Simultaneously with such treatment, a particle counter 85 measures the amount of remaining fumes or dusts in the chamber 5, and an oxygen content sensor 87 measures the oxygen content in the chamber 5 so that the three-dimensional object can be removed through the opening 52 by opening the lid 51 when the amount of remaining fumes and the oxygen content have been less than respective predetermined values. In FIG. 15, reference numeral 83 denotes a pump to supply inert gas (nitrogen gas) into the chamber 5, and reference numeral C denotes a controller for controlling operation of the apparatus. The controller C, to which the particle counter 85 and the oxygen content sensor 87 are both electrically connected, also controls the powdery layer-forming unit 2 and the optical beam-irradiating unit 3, and further controls the lid 51 and valves 86 disposed between the chamber 5 and the pumps 81, 83 or the compressor 82 to open and close them.

Figure 16A:
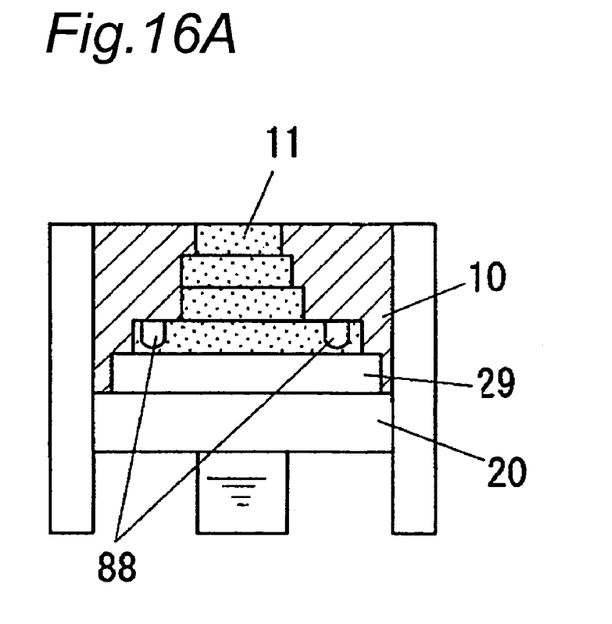
FIG. 16A is a schematic vertical sectional view depicting a case where tapped holes for hanging bolts are formed in a shaped object in the apparatus according to the present invention.
Figure 16B:
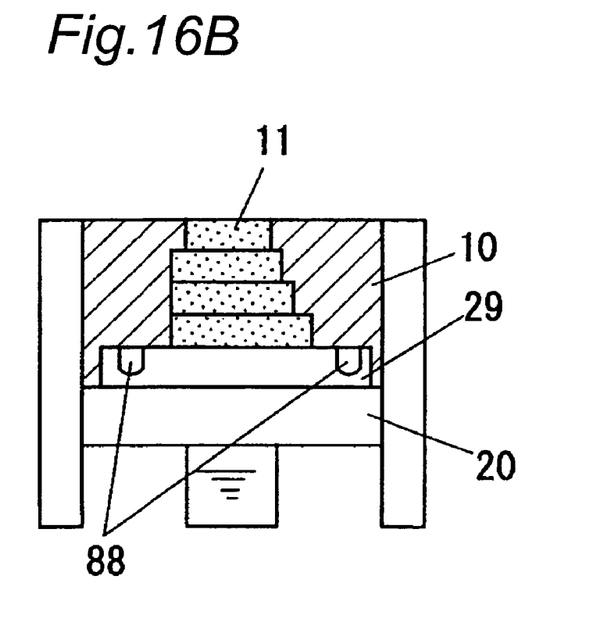
FIG. 16B is a schematic vertical sectional view depicting a case where tapped holes for hanging bolts are formed in a plate interposed between the shaped object and a table in the apparatus according to the present invention.

In order to facilitate removal of the shaped object by a crane 8, it is preferred that tapped holes 88 for hanging bolts be formed in a shaped object during sintering, as shown in FIG. 16A or in a plate 29 interposed between the shaped object and the table 20, as shown in FIG. 16B. In this case, a plurality of tapped holes 88 are first formed in the shaped object or the plate 29 at predetermined positions thereof, the powdery material is removed upon completion of the shaping, and tapping is then conducted. By so doing, the shaped object can be lifted up with the crane using, for example, wire ropes and eye bolts screwed into the tapped holes.

It is to be noted here that although in the above-described embodiments the apparatus for making a three-dimensional object has been described as not having a machining means that is used to machine a surface of a shaped object every time a predetermined number of sintered layers 11 have been formed, the present invention is also applicable to an apparatus provided with a machining means.

The machining means can be constituted by, for example, a milling head 41 that is mounted on a base of the powdery layer-forming unit 2 via an XY drive mechanism. In this case, when the total thickness of the sintered layers 11 reaches a specific value that has been determined from, for example, the tool length of the milling head, the machining means is activated to cut the surface of the object that has been shaped by that time. The machining means can remove a low-density surface layer created by adhesion of the powder to the surface of the shaped object and can simultaneously cut out a portion of a high-density region inside it, thereby exposing the high-density region over the entire surface of the shaped object. For example, a tool of the machining means having a diameter of 1 mm and an effective blade length (length under head) of 3 mm can achieve cutting of a depth of 3 mm, and if the thickness $\Delta t1$ of the powdery layer 10 is 0.05 mm, the machining means is activated, for example, when sixty sintered layers 11 have been formed.

The invention claimed is:

1. An apparatus for making a three-dimensional object, comprising:
   a table;
   a powdery layer-forming unit for forming a powdery layer on the table; and
   an optical beam-irradiating unit for irradiating an optical beam on a predetermined region of the powdery layer to sinter the predetermined region of the powdery layer, and
   a fume blocker permeable to light for blocking fumes generated during sintering from passing therethrough, wherein:
   the optical beam-irradiating unit is disposed at a position deviated from immediately above an optical beam-irradiating range to obliquely irradiate the optical beam on the powdery layer,
   the optical beam-irradiating unit comprises a beam shape-correcting unit configured to correct a shape of the optical beam to form a generally round spot beam on a surface to be irradiated,
   the fume blocker is horizontally interposed between the optical beam-irradiating range and a portion of the optical beam-irradiating unit from which the optical beam is emitted, and
   the fume blocker forms is a gas layer between the optical beam-irradiating range and the optical beam-irradiating unit by causing a gas to flow from a top downward,
   wherein the fume blocker comprises a vertically extending transparent plate.

2. The apparatus for making a three-dimensional object according to claim 1, further comprising a fume capturing unit disposed immediately above the optical beam-irradiating range to capture the fumes.

3. The apparatus for making a three-dimensional object according to claim 1, further comprising a chamber for accommodating the table and the powdery layer-forming unit therein and a lid for opening and closing an opening defined in the chamber at a location immediately above the optical beam-irradiating range, wherein the three-dimensional object is taken out from the chamber through the opening upon completion of the sintering.

4. The apparatus for making a three-dimensional object according to claim 3, further comprising an air supply unit for cleaning an atmosphere inside the chamber and for replacing an atmospheric gas with air, an oxygen content measuring unit for measuring an oxygen content within the chamber, a fume measuring unit for measuring an amount of fumes that remain in the chamber, and a controller for controlling the air supply unit, the oxygen content measuring unit, and the fume measuring unit.

5. An apparatus for making a three-dimensional object, comprising:

a table;

a powdery layer-forming unit for forming a powdery layer on the table; and an optical beam-irradiating unit for irradiating an optical beam on a predetermined region of the powdery layer to sinter the predetermined region of the powdery layer, and a fume blocker permeable to light for blocking fumes generated during sintering from passing therethrough, wherein:

the optical beam-irradiating unit is disposed at a position deviated from immediately above an optical beam-irradiating range to obliquely irradiate the optical beam on the powdery layer, the optical beam-irradiating unit comprises a beam shape-correcting unit configured to correct a shape of the optical beam to form a generally round spot beam on a surface to be irradiated, the fume blocker is horizontally interposed between the optical beam-irradiating range and a portion of the optical beam-irradiating unit from which the optical beam is emitted, and the fume blocker forms a gas layer between the optical beam-irradiating range and the optical beam-irradiating unit by causing a gas to flow from a top downward, wherein the fume blocker comprises a substantially vertically extending gas curtain.

* * * * *

UNITED STATES PATENT AND TRADEMARK OFFICE
CERTIFICATE OF CORRECTION

| | | |
|---|---|---|
| PATENT NO. | : 8,062,020 B2 | |
| APPLICATION NO. | : 10/546454 | |
| DATED | : November 22, 2011 | |
| INVENTOR(S) | : S. Abe et al. | |

It is certified that error appears in the above-identified patent and that said Letters Patent is hereby corrected as shown below:

At column 8, line 54 (claim 1, line 25) of the printed patent, please delete "is" after "forms."

Signed and Sealed this
Twenty-seventh Day of March, 2012

David J. Kappos
*Director of the United States Patent and Trademark Office*